United States Patent
Alexiou et al.

(10) Patent No.: US 11,015,699 B2
(45) Date of Patent: *May 25, 2021

(54) VEHICLE DRIVETRAIN COMPONENT HAVING AN INTERNAL VENT RELOCATION TUBE FOR VENTING A HOUSING OF THE VEHICLE DRIVETRAIN COMPONENT

(71) Applicant: BorgWarner Inc., Auburn Hills, MI (US)

(72) Inventors: Arie Alexiou, Pontiac, MI (US); Jeffrey Elder, Kimball, MI (US); Ian D. Worcester, Royal Oak, MI (US); Hongtao Wang, Rochester Hills, MI (US)

(73) Assignee: BorgWarner Inc., Auburn Hills, MI (US)

( * ) Notice: Subject to any disclaimer, the term of this patent is extended or adjusted under 35 U.S.C. 154(b) by 329 days.

This patent is subject to a terminal disclaimer.

(21) Appl. No.: 16/043,233

(22) Filed: Jul. 24, 2018

(65) Prior Publication Data

US 2019/0309840 A1 Oct. 10, 2019

Related U.S. Application Data

(63) Continuation of application No. 15/947,885, filed on Apr. 9, 2018, now Pat. No. 10,054,213.

(51) Int. Cl.
*F16H 57/027* (2012.01)
*F16H 57/04* (2010.01)
*B60K 17/344* (2006.01)

(52) U.S. Cl.
CPC ......... *F16H 57/027* (2013.01); *B60K 17/344* (2013.01); *F16H 57/0409* (2013.01); *F16H 57/0457* (2013.01); *B60Y 2306/05* (2013.01)

(58) Field of Classification Search
CPC .. F16H 57/027; F16H 57/035; Y10T 74/2186; B60K 17/344; B60K 23/0808
USPC ............................................. 474/144; 184/59
See application file for complete search history.

(56) References Cited

U.S. PATENT DOCUMENTS

| 362,667 | A | * | 5/1887 | Schappstadt | ............ F16N 15/00 184/59 |
| 1,660,943 | A | * | 2/1928 | Warren | .................... F01M 3/04 261/121.1 |
| 2,074,045 | A | * | 3/1937 | Carpenter | ................. D21F 7/02 34/120 |

(Continued)

*Primary Examiner* — Henry Y Liu
(74) *Attorney, Agent, or Firm* — Burris Law, PLLC

(57) ABSTRACT

A driveline power transmitting component having a power transfer assembly disposed in a housing. The housing defines a vent aperture and a sump. A lubricating fluid is disposed in the sump and portions of the power transfer assembly travel through the lubricating fluid so that a lubrication surge zone and a splash lubrication zone are formed. The vent aperture is disposed in at least one of the surge zone, the splash lubrication zone and the sump when the driveline power transmitting component is disposed in at least one orientation in a predetermined range of operating positions in which the driveline power transmitting component can be operated. A breather relocation conduit is employed to permit air to be vented from the housing to the vent aperture without intaking lubricating fluid into the breather relocation conduit.

17 Claims, 8 Drawing Sheets

(56) References Cited

U.S. PATENT DOCUMENTS

| | | | | | |
|---|---|---|---|---|---|
| 2,912,882 | A | * | 11/1959 | Wilson | E21B 3/02 474/144 |
| 3,447,500 | A | * | 6/1969 | Spinrad | D05B 83/00 112/261 |
| 3,605,295 | A | * | 9/1971 | Walewski | E02F 3/655 37/305 |
| 3,724,582 | A | * | 4/1973 | Wood | B62J 13/04 180/219 |
| 4,601,684 | A | * | 7/1986 | Geary | F16G 5/06 474/144 |
| 4,911,035 | A | * | 3/1990 | Taguchi | F16H 57/027 74/606 A |
| 4,940,446 | A | * | 7/1990 | Inui | B60K 17/22 474/144 |
| 5,724,864 | A | * | 3/1998 | Rodgers | F16H 57/027 74/606 R |
| 5,755,194 | A | * | 5/1998 | Moorman | F02F 1/002 123/196 W |
| 5,916,051 | A | * | 6/1999 | Schleuder | B60K 17/344 475/138 |
| 5,993,308 | A | * | 11/1999 | Martin | A22C 21/06 452/177 |
| 6,123,175 | A | * | 9/2000 | Fett | B60B 35/16 184/59 |
| 6,354,977 | B1 | * | 3/2002 | Brown | B60K 17/3467 180/349 |
| 6,557,438 | B2 | * | 5/2003 | Maeda | F01M 13/00 184/6.12 |
| 7,704,174 | B2 | * | 4/2010 | Takada | F02B 75/007 474/144 |
| 8,337,346 | B2 | * | 12/2012 | Kochidomari | F16H 57/035 474/144 |
| 8,382,620 | B2 | * | 2/2013 | Morita | F16H 57/035 474/13 |
| 8,887,870 | B2 | * | 11/2014 | Okada | F16H 57/027 184/6.23 |
| 2004/0104077 | A1 | * | 6/2004 | Szalony | F16H 57/0483 184/6.23 |
| 2004/0118233 | A1 | * | 6/2004 | Weilant | B60K 17/344 74/334 |
| 2004/0200462 | A1 | * | 10/2004 | Hara | F01M 13/022 123/572 |
| 2005/0107200 | A1 | * | 5/2005 | Yamazaki | B60K 23/0808 475/84 |
| 2010/0024591 | A1 | * | 2/2010 | Yamaguchi | F16H 57/037 74/606 R |
| 2012/0160057 | A1 | * | 6/2012 | Couto | F16H 57/035 74/665 F |
| 2014/0343807 | A1 | * | 11/2014 | Maki | F16H 63/3441 701/51 |
| 2015/0367924 | A1 | * | 12/2015 | Davis | B63H 20/08 440/53 |
| 2017/0292570 | A1 | * | 10/2017 | Ketchel | B60K 17/344 |
| 2017/0299046 | A1 | * | 10/2017 | Reth | F16D 13/72 |

* cited by examiner

VEHICLE DRIVETRAIN COMPONENT HAVING AN INTERNAL VENT RELOCATION TUBE FOR VENTING A HOUSING OF THE VEHICLE DRIVETRAIN COMPONENT

CROSS-REFERENCE TO RELATED APPLICATIONS

This application is a continuation of U.S. application Ser. No. 15/947,885 filed Apr. 9, 2018, the disclosure of which is incorporated by reference as if fully set forth in detail herein.

FIELD

The present disclosure relates to a vehicle drivetrain component having an internal vent relocation tube for venting a housing of the vehicle drivetrain component.

BACKGROUND

This section provides background information related to the present disclosure which is not necessarily prior art.

Automotive drivetrain components such as transfer cases, differential assemblies and like are often lubricated to maintain a desired level of performance. It is commonplace for such automotive drivetrain components to include a breather vent to maintain the air pressure in such components within desired pressure levels. It is desirable that lubricating fluid not escape through the breather vent during operation of the vehicle drivetrain component.

The site in the housing for venting a given automotive drivetrain component can often times be selected to ensure that the breather vent is able to operate without risk of expelling lubricant from the breather vent when the automotive drivetrain component is operated through a predetermined range of operating positions. There are instances, however, where the site in the housing for venting a given automotive drivetrain component is placed at a site where there is a high risk that the breather vent will expel lubricant when the automotive drivetrain component is operated at one or more positions in the predetermined range of operating positions. For example, the site for venting the automotive drivetrain component may have been placed in a location that was selected by an OEM without consideration of the risk that the breather vent would expel lubricant when the automotive drivetrain component is operated at one or more positions in the predetermined range of operating positions.

SUMMARY

This section provides a general summary of the disclosure, and is not a comprehensive disclosure of its full scope or all of its features.

In one form, the teachings of the present disclosure provide a driveline power transmitting component for a vehicle. The driveline power transmitting component is orientable into a predetermined range of operating positions that are associated with operation of the vehicle on a range of road grades. The predetermined range of operating positions includes a baseline operating position that is associated with operation of the vehicle on a flat, level surface. The driveline power transmitting component includes a housing, a first rotary drive member, a second rotary drive member, a power transfer assembly and a tube. The housing defines an internal cavity and a vent aperture. The internal cavity defines a sump that is configured to hold a volume of lubricating fluid that establishes a lubricant level within the sump when the driveline power transmitting component is oriented in the baseline operating position but is not operated to transmit rotary power. The vent aperture extends through the housing. The first rotary drive member is received in the housing and projects into the internal cavity. The first rotary drive member is rotatable relative to the housing about a first axis. The second rotary drive member is received in the housing and projects into the internal cavity. The second rotary drive member is rotatable relative to the housing about a second axis. The power transfer assembly is configured to transmit rotary power between the first and second drive members. A surge zone and a splash lubrication zone are created when the power transfer assembly transmits rotary power between the first and second drive members to drive the second drive member in a predetermined rotational direction. The surge zone is at least partly formed by lubricating fluid that clings to an element of the power transmitting assembly as the element of the power transmitting assembly moves out of the lubricating fluid in the sump. The splash lubrication zone is a volume of the internal cavity where lubricating fluid is discharged due to centrifugal force from components of the driveline power transmitting component that rotate in the internal cavity when the driveline power transmitting component is operated. The vent aperture is disposed in at least one of the surge zone, the splash lubrication zone and the sump when the driveline power transmitting component is disposed in at least one orientation in the predetermined range of operating positions. The tube is received in the internal cavity and is coupled to the housing. The tube has a vent discharge, which is coupled in fluid communication with the vent aperture, and a vent intake that is positioned in the internal cavity at a vent location that is outside of the surge zone and the sump. Additionally, the vent location is positioned either outside of the splash lubrication zone or within the splash lubrication zone but facing away from splash lubrication generated by the components of the driveline power transmitting component.

In another form, the teachings of the present disclosure provide a transfer case for a vehicle. The transfer case is orientable into a predetermined range of operating positions that are associated with operation of the vehicle on a range of road grades. The predetermined range of operating positions includes a baseline operating position that is associated with operation of the vehicle on a flat, level surface. The transfer case includes a housing, a first rotary drive member, a first sprocket, a second rotary drive member, a second sprocket, a chain and a tube. The housing defines an internal cavity and a vent aperture. The internal cavity defines a sump that is configured to hold a volume of lubricating fluid that establishes a lubricant level within the sump when the transfer case is oriented in the baseline operating position but is not operated to transmit rotary power. The vent aperture extends through the housing. The first rotary drive member is received in the housing and projects into the internal cavity. The first rotary drive member is rotatable relative to the housing about a first axis. The first sprocket is received in the internal cavity and is coupled to the first rotary drive member for rotation therewith. The second rotary drive member is received in the housing and projects into the internal cavity. The second rotary drive member is rotatable relative to the housing about a second axis that is offset from and parallel to the first axis. The second sprocket is received in the internal cavity and is coupled to the second rotary drive member for rotation therewith. At least a portion of the second sprocket is disposed in the sump at a location that is vertically below the lubricant level when the transfer case is operated in the baseline operating position. The chain comprises a plurality of links and is drivingly engaged to the first and second sprockets to transmit rotary power there between. A surge zone and a splash lubrication zone are created when the chain transmits rotary power between the first and second sprockets in a predetermined rotational direction. The surge zone is at least partly formed by lubricating fluid that clings to the chain proximate the second sprocket as links of the chain move out of the lubricating fluid in the sump toward the first sprocket. The splash lubrication zone is a volume of the internal cavity where lubricating fluid is discharged due to centrifugal force from components of the transfer case, including the chain, the first sprocket and the first rotary drive member, that rotate in the internal cavity when the transfer case is operated. The vent aperture is disposed in at least one of the surge zone, the splash lubrication zone and the sump when the transfer case is disposed in at least one orientation in the predetermined range of operating positions. The tube is received in the internal cavity and is coupled to the housing. The tube has a vent discharge, which is coupled in fluid communication with the vent aperture, and a vent intake that is positioned in the internal cavity at a vent location that is outside of the surge zone and the sump. Additionally, the vent location is positioned either outside of the splash lubrication zone or within the splash lubrication zone but facing away from splash lubrication generated by the components of the transfer case.

In still another form, the teachings of the present disclosure provide a transfer case for a vehicle. The transfer case is orientable into a predetermined range of operating positions that are associated with operation of the vehicle on a range of road grades. The predetermined range of operating positions includes a baseline operating position that is associated with operation of the vehicle on a flat, level surface. The transfer case includes a housing, a first rotary drive member, a first sprocket, a second rotary drive member, a second sprocket, a chain and a breather conduit. The housing defines an internal cavity and a vent aperture. The internal cavity defines a sump that is configured to hold a volume of lubricating fluid that establishes a lubricant level within the sump when the transfer case is oriented in the baseline operating position but is not operated to transmit rotary power. The vent aperture extends through the housing. The first rotary drive member is received in the housing and projects into the internal cavity. The first rotary drive member is rotatable relative to the housing about a first axis. The first sprocket is received in the internal cavity and is coupled to the first rotary drive member for rotation therewith. The second rotary drive member is received in the housing and projects into the internal cavity. The second rotary drive member is rotatable relative to the housing about a second axis that is offset from and parallel to the first axis. The second sprocket is received in the internal cavity and is coupled to the second rotary drive member for rotation therewith. At least a portion of the second sprocket is disposed in the sump at a location that is vertically below the lubricant level when the transfer case is operated in the baseline operating position. The chain comprises a plurality of links and is drivingly engaged to the first and second sprockets to transmit rotary power there between. A surge zone and a splash lubrication zone are created when the chain transmits rotary power between the first and second sprockets in a predetermined rotational direction. The surge zone is at least partly formed by lubricating fluid that clings to the chain proximate the second sprocket as links of the chain move out of the lubricating fluid in the sump toward the first sprocket. The splash lubrication zone is a volume of the internal cavity where lubricating fluid is discharged due to centrifugal force from components of the transfer case, including the chain, the first sprocket and the first rotary drive member, that rotate in the internal cavity when the transfer case is operated. The vent aperture is disposed in at least one of the surge zone, the splash lubrication zone and the sump when the transfer case is disposed in at least one orientation in the predetermined range of operating positions. The breather conduit is coupled to the housing and includes a vent discharge, which is coupled in fluid communication with the vent aperture, and a vent intake. The vent intake is positioned to receive air from the internal cavity at a vent location that is outside of the surge zone and the sump. Additionally, the vent location is positioned either outside of the splash lubrication zone or within the splash lubrication zone but facing away from splash lubrication generated by the components of the transfer case.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
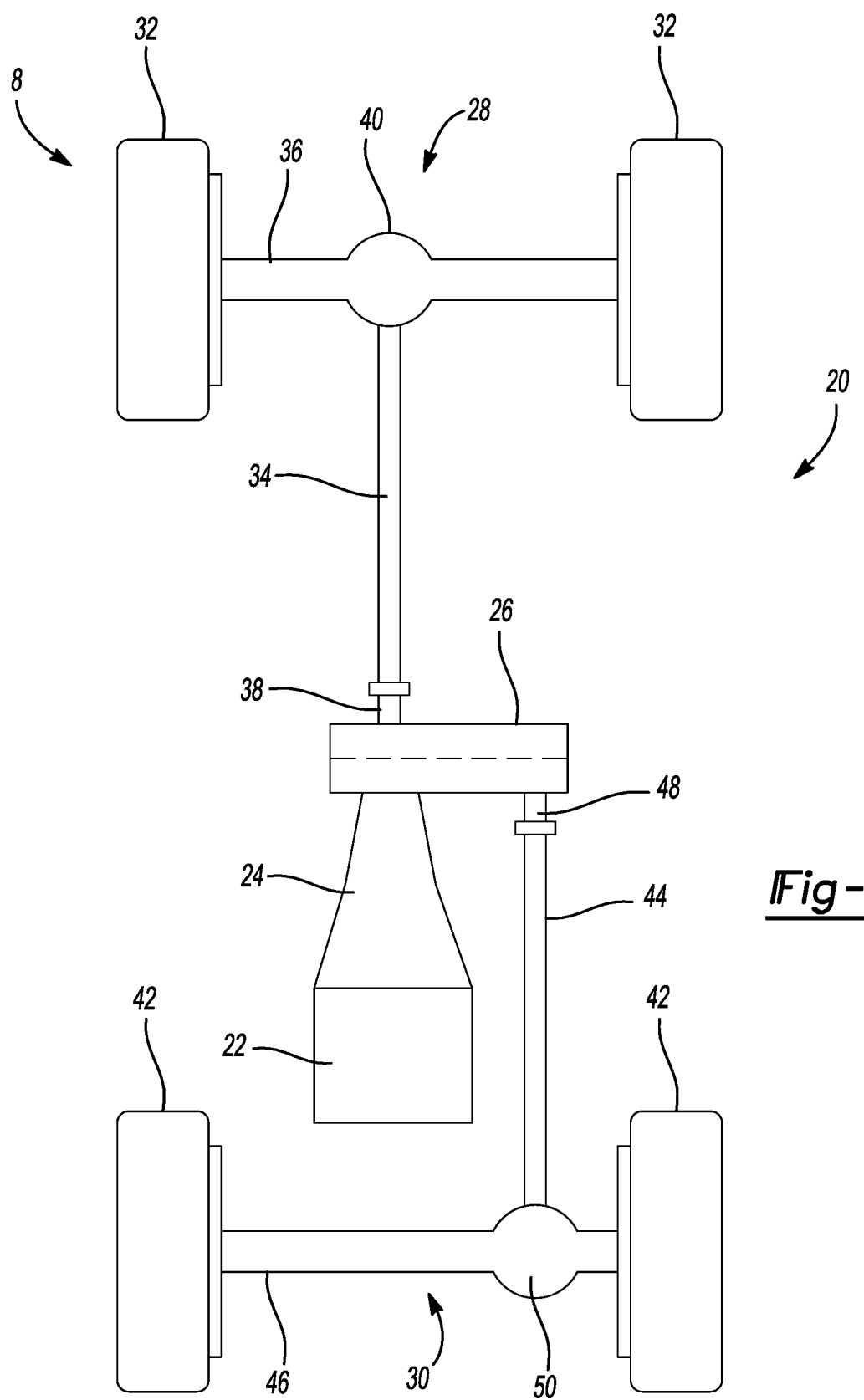
FIG. 1 is a schematic illustration of a drivetrain having a transfer case constructed in accordance with the teachings of the present disclosure.

With reference to FIG. 1 of the drawings, a drivetrain 20 of a vehicle 8 is illustrated as including an engine 22, a transmission 24, a transfer case 26, a first driveline assembly 28 and a second driveline assembly 30. The engine 22 and the transmission 24 comprise a powertrain that is operable for providing rotary power to the remainder of the drivetrain 20.

A detailed discussion of the transfer case 26 will be provided below. Briefly, the transfer case 26 can be driven by the engine 22 and transmission 24 and can include a first output shaft 38, which is drivingly coupled to first driveline assembly 28, and a second output shaft 48 that is drivingly coupled to the second driveline assembly 30. The transfer case 26 is configured to deliver rotary power to the first and second driveline assemblies 28 and 30 via the first and second output shafts 38 and 48, respectively. Optionally, the transfer case 26 could be configured to deliver rotary power to one of the first and second driveline assemblies 28 and 30 on a full-time or continuous basis, and to deliver rotary power to the other one of the first and second driveline assemblies 28 and 30 on a part-time or selective basis.

The first driveline assembly 28 includes a pair of first wheels 32, a first drive shaft 34, and a first axle assembly 36 that drivingly couples the first drive shaft 34 to the first wheels 32. The first drive shaft 34 is rotatably coupled to the first output shaft 38 of the transfer case 26. The first drive shaft 34 is also rotatably coupled to an input of the first axle assembly 36, such as an input pinion (not shown). The first axle assembly 36 may include a first differential 40 having differential gearing or other means (e.g., one or more clutches) that permit speed differentiation between the first wheels 32.

The second driveline assembly 30 can include a pair of second wheels 42, a second drive shaft 44 and a second axle assembly 46 that can drivingly couple the second drive shaft 44 to the second wheels 42. The second drive shaft 44 is rotatably coupled to the second output shaft 48 of the transfer case 26. The second drive shaft 44 is also rotatably coupled to an input of the second axle assembly 46, such as an input pinion (not shown). The second axle assembly 46 may include a second differential 50 having differential gearing or other means (e.g., one or more clutches) that permit speed differentiation between the second wheels 42.

Figure 2:
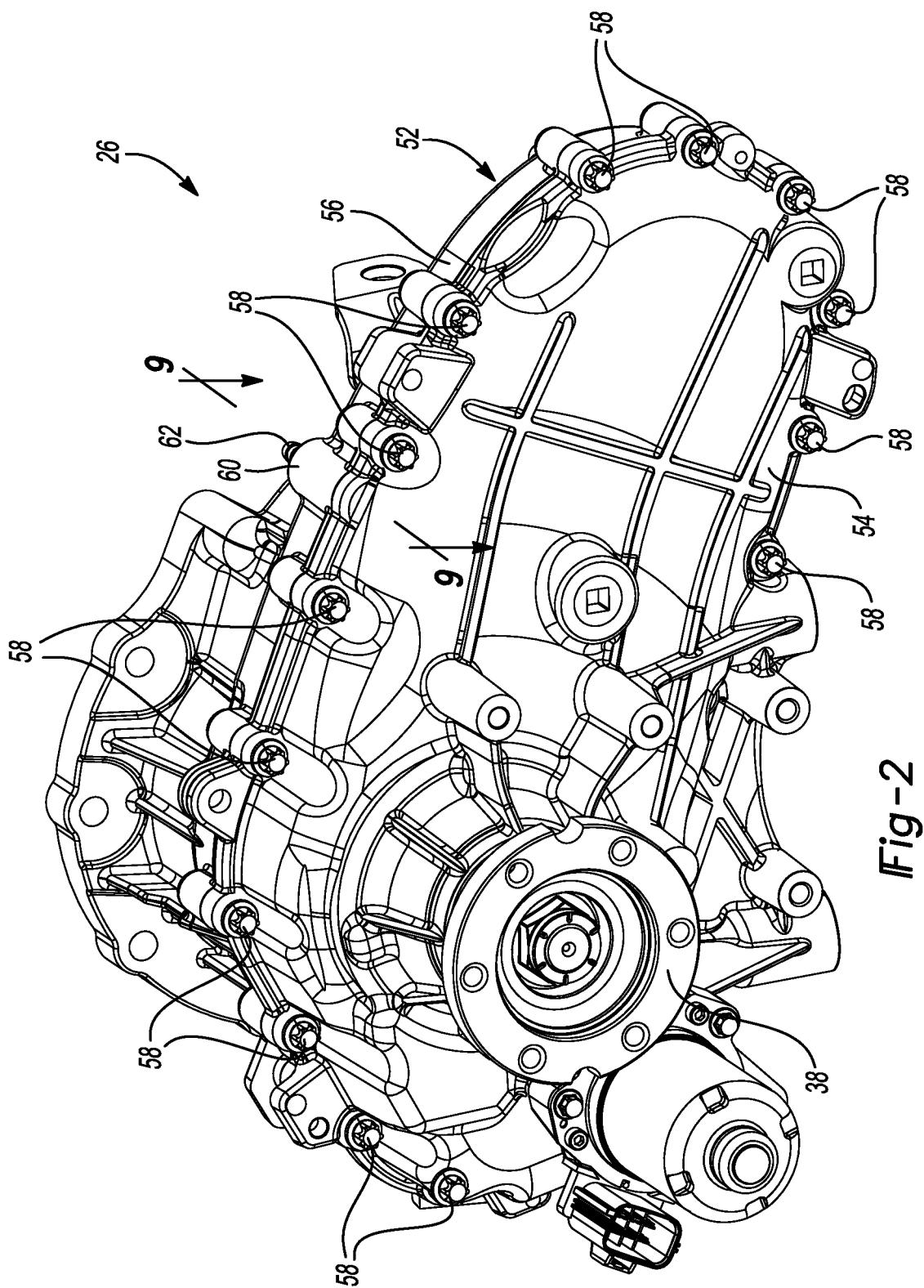
FIG. 2 is a perspective view illustrating a rear side of the transfer case of FIG. 1.
Figure 3:
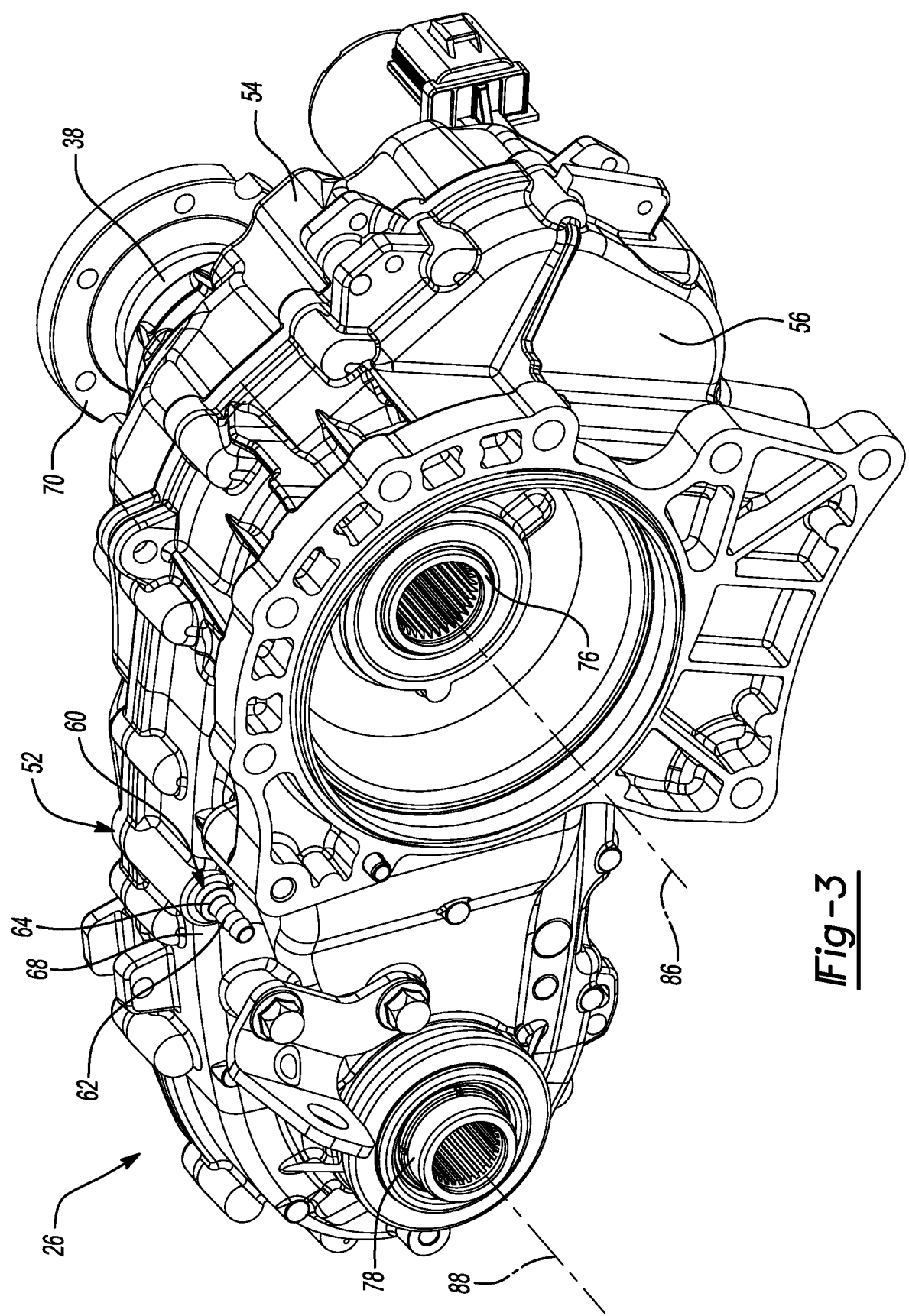
FIG. 3 is a perspective view illustrating a front side of the transfer case of FIG. 1.
Figure 4:
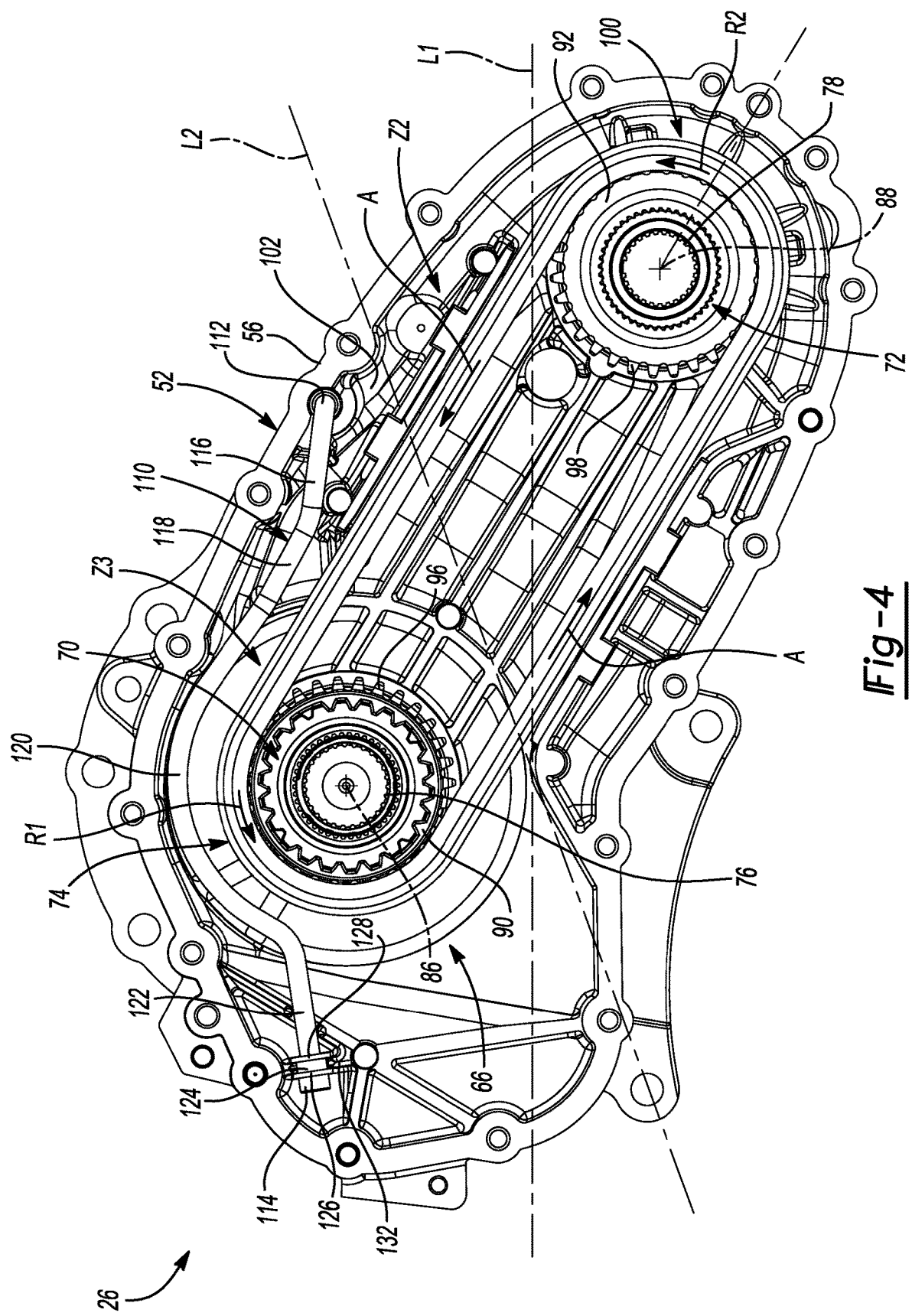
FIG. 4 is a rear view of the transfer case of FIG. 1 with a rear portion of a housing of the transfer case removed.

With reference to FIGS. 2-4, the transfer case 26 includes a housing 52, a first rotary drive member 76, a second rotary drive member 78, a power transfer assembly 74 and a breather conduit or vent relocation conduit 110. The housing 52 has a first (or rear) portion 54 and a second (or front) portion 56 that are joined together in a suitable manner, such as via a plurality of threaded fasteners 58, to define an internal cavity 66 in which the various power transfer components of the transfer case 26 are enclosed.

As further shown, the housing 52 includes a breather vent 60. The breather vent 60 defines a vent aperture 64 that extends through a wall member 68 in the housing 52 and permits the internal cavity 66 to vent to the atmosphere (i.e., to the air outside the housing 52). In this manner, a pressure of the air within the housing 52 of the transfer case 26 can be maintained within a predetermined pressure range (relative to atmospheric air pressure) when the transfer case 26 is operated in a predetermined range of operating positions. In the example shown, the breather vent 60 is positioned in the second portion 56 of the housing 52. Optionally, a vent outlet connector 62 can be coupled to the breather vent 60 to permit the transfer case to be vented to a location that is remote from the transfer case. The vent outlet connector 62 will be discussed in more detail below.

In FIGS. 3 and 4, first rotary drive member 76 can be supported in the housing 52 for rotation about a first axis 86.

In the example provided, the first rotary drive member 76 is a shaft having a first end with an internally-splined aperture that is configured to engage a cooperating male-splined output shaft (not shown) of the transmission 24 (FIG. 1), and a second, opposite end that is non-rotatably coupled to a flange 70 that is configured to be rotatably coupled to the first drive shaft 34 (FIG. 1). It will be appreciated, however, that a transmission (not shown), such as a multi-speed transmission, could be disposed between the first rotary drive member 76 and the output shaft of the transmission 24 (FIG. 1).

The second rotary drive member 78 can be supported in the housing 52 for rotation about a second axis 88. In the example provided, the second rotary drive member 78 is an internally-splined shaft that is configured to be rotatably coupled to a cooperating splined segment (not shown) on the second drive shaft 44 (FIG. 1).

The power transfer assembly 74 can include a first sprocket 90, which is rotatably coupled to the first rotary drive member 76, a second sprocket 92, which is rotatably coupled to the second rotary drive member 78, and a chain 94. In the example provided, the first sprocket 90 is directly coupled to the first rotary drive member 76 for common rotation and the second sprocket 92 is directly coupled to the second rotary drive member 78 for common rotation. It will be appreciated, however, that the first sprocket 90 could be coupled to the first rotary drive member 76 through a clutch (not shown) that permits the first sprocket 90 to be selectively driven by the first rotary drive member 76. The chain 94 can conventionally include a plurality of chain teeth that can engage first teeth 96, which are formed on the first sprocket 90, and second teeth 98 that are formed on the second sprocket 92. Driving engagement of the chain 94 to the first and second sprockets 90 and 92 facilitates the transmission of rotary power between the first and second sprockets 90 and 92. Accordingly, it will be appreciated that rotation of the first sprocket 90 about the first axis 86 (caused by rotation of the first rotary drive member 76) caused movement of the chain 94, which in turn causes rotation of the second sprocket 92 about the second axis 88 to thereby drive the second rotary drive member 78.

The transfer case 26 is configured to be operated in an orientation within a predetermined range of operating positions that are associated with operation of the vehicle 8 (FIG. 1) on a range of road grades. It will be appreciated that the predetermined range of operating positions includes both roll and pitch. Roll is rotation of the vehicle 8 (FIG. 1) about its longitudinal axis, whereas pitch is rotation of the vehicle 8 (FIG. 1) about its lateral axis. One such operating position within the predetermined range of operating positions is a "baseline operating position", which is the orientation of the transfer case 26 when the vehicle 8 (FIG. 1) is disposed on a flat, level surface. FIG. 4 depicts the transfer case 26 as oriented in the baseline operating position. As used herein, directional or relative terms (e.g., upper, lower, above, below) that describe the positioning of the elements of the transfer case 26 in the present disclosure describe such relationship as if the transfer case 26 is in the baseline operating position unless explicit reference is made otherwise.

It will be appreciated that lubrication of various internal components of the transfer case 26 during operation of the transfer case 26 is desirable to reduce wear and noise, as well as to provide cooling. A portion of the internal cavity 66 of the housing 52 can define a sump 100 that is configured to hold a volume of a suitable lubricating fluid.

When the transfer case 26 is oriented in the baseline operating position and the power transfer assembly 74 is not being operated to transmit rotary power, the volume of lubricating fluid in the sump 100 establishes a static lubricant level L1 as shown. In such a position, at least a portion of the second sprocket 92 and a portion of the chain 94 are disposed in the sump 100 and are in contact with the volume of lubricating fluid. In other examples, the shape and size of the internal cavity 66 and/or the sump 100 can be different such the second sprocket 92 and the chain 94 are disposed in the sump 100 and in contact with the volume of lubricating fluid to different degrees. In the example shown, the second sprocket 92 is disposed entirely below the static lubricant level L1 and is covered by the volume of lubricating fluid when the transfer case 26 is oriented in the baseline operating position and the power transfer assembly 74 is not being operated to transmit rotary power. In other examples, approximately one-half of the second sprocket 92 is positioned in the sump 100 and/or below the static lubricant level L1.

The power transfer assembly 74 can be operated such that the first sprocket 90 rotates about the first axis 86 in a direction designated by arrow R1, which moves the chain 96 in the direction depicted by the arrows A in FIG. 4 to correspondingly drive the second sprocket 92 about the second axis 88 in the direction of arrow R2. The rotation of the second sprocket 92 in the direction of arrow R2 in the sump 100 and the movement of the chain 94 in the direction of arrows A through the sump 100 causes some of the lubricating fluid to move in the internal cavity 66. More specifically, momentum imparted by the power transfer assembly 74 to the lubricating fluid located proximate the portion of the drive chain 96 that is departing the second sprocket 92 and traveling toward the first sprocket 90, as well as lubricating fluid that clings to the portion of the drive chain 96 that is departing the second sprocket 92 and traveling toward the first sprocket 90 can cause the lubricating fluid to surge within the internal cavity 66 to a surge level L2 that is vertically higher than the static lubricant level L1. The surging lubricating fluid forms a surge zone Z2. It will be appreciated that the shape and orientation of the surge zone Z2 and the relative position of the surge level L2 will change depending on the position of the transfer case 26 within the predetermined range of operating positions. Additionally, lubricating fluid that clings to a moving portion of the power transfer assembly 74 (e.g., the chain 96, and depending on the operating position of the transfer case 26, the second sprocket 92) as the moving portion of the power transfer assembly 74 rotates through and exits the lubricating fluid in the sump 100 can be slung outwardly from the moving portion of the power transfer assembly 74 where it can collect on another structure, such as the interior surface 102 of the housing 52.

In the example provided, the vent aperture 64 is disposed in an area of the housing 52 where it would be exposed to the slung lubricant that drains down the interior surface 102 of the housing 52 as the slung lubricant migrates back to the sump 100. Additionally, the vent aperture 64 is sufficiently close to the surge zone Z2 so that placement of the transfer case 26 in one or more positions within the predetermined range of operating positions would permit lubricating fluid in the surge zone Z2 to escape through the vent aperture 64.

Figure 5:
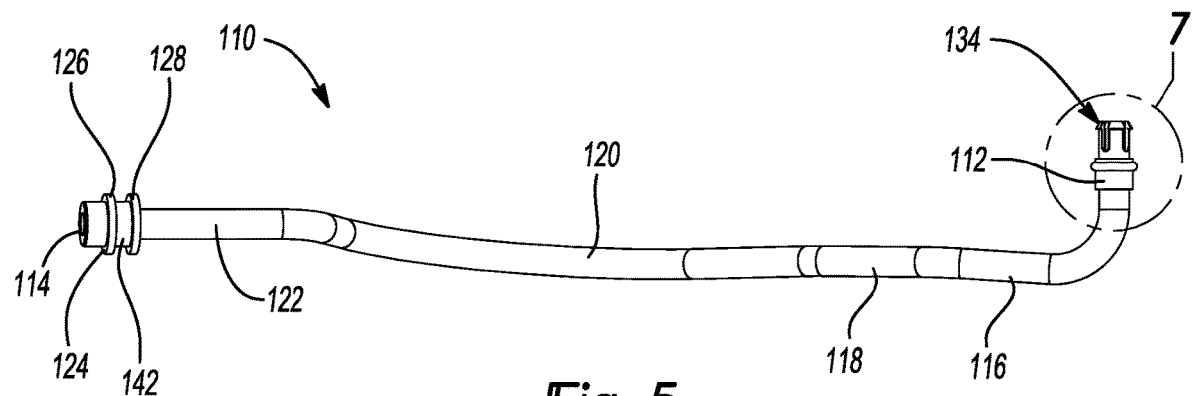
FIG. 5 is a perspective view of a portion of the transfer case of FIG. 1 illustrating an vent relocation conduit in more detail.

With reference to FIGS. 4 and 5, the vent relocation conduit 110 is a hollow, tubular structure that can have a first end, which can define a vent discharge 112, and a second, opposite end that can define a vent intake 114. The vent relocation conduit 110 can be unitarily and integrally formed of any suitable metal or plastic material, or could be formed as two or more discrete components that can be assembled to one another. Alternatively, the vent relocation conduit 110 could be formed as two or more components that can be assembled to one another, The two or more components could be discrete components that are assembled to one another and the housing 52, or one of the components could be unitarily and integrally formed with the housing 52. The vent relocation conduit 110 can be secured in any desired manner within the housing 52 such that the vent discharge 112 is coupled in fluid communication with the vent aperture 64. The vent relocation conduit 110 is sized (in length) and shape to physically clear the components of the transfer case 26 that move or rotate in the internal cavity 66 as well as to position the vent intake 114 at a location within the cavity 66 where lubricant is not likely to be drawn into the vent intake 114 during operation of the transfer case 26 in any position in the predetermined range of operating positions. In the example provided, the vent relocation conduit 110 positions the vent intake 114 in a location that is outside the surge zone Z2 and the sump 100 where the vent intake 114 will not be exposed to lubricating fluid that drains from another component of the transfer case 26, such as the interior surface 102 of the housing 52, as well as faces the vent intake 114 away from moving/rotating components of the transfer case 26 from which lubricant will be slung. While the vent intake 114 is positioned in the splash lubrication zone Z3 in the example provided, the air proximate the vent intake 114 is relatively free of lubricating oil in the form of drops or mist.

In the particular example provided, the vent relocation conduit 110 is formed of a non-porous material without openings in the span between the vent discharge 112 and the vent intake 114 and includes a first linear portion 116, a second linear portion 118, a curved portion 120 and an extending portion 122. The first end of the vent relocation conduit 110 is disposed on the first linear portion 116. The vent relocation conduit 110 can be formed such that it has a substantially constant interior cross-sectional area over substantially all of its developed length. As used herein, the term "substantially constant interior cross-sectional area" means that the cross-sectional area of the relevant portion of the vent relocation conduit 110 varies by an amount that less than or equal to 15%, and the term "substantially all of its developed length" means 85% or more of the developed length of the vent relocation conduit 110. The vent relocation conduit 110 extends away from the vent aperture 64 along the first linear portion 116 and then turns through an approximately 90 degree bend before extending further away from the vent aperture 64 along the second linear portion 118. The vent relocation conduit 110 also wraps around and is radially spaced apart from a portion of the first sprocket 90 and the chain 94 at the curved portion 120. The curved portion 120, which is disposed between and physically connects the second linear portion 118 to the extending portion 122, can be defined by a radius that is centered on the first axis 86. The extending portion 122 extends from the curved portion 120 in a direction away from the first sprocket 90 and terminates at the second end of the vent relocation conduit 110. It will be appreciated that the vent relocation conduit 110 can be configured to reduce the likelihood that lubricating fluid is able to collect within the vent relocation conduit 110 and drain toward the vent aperture 64. In this regard, the extending portion 122 can slope downwardly from the curved portion 120 when the transfer case 26 is disposed in its baseline operating position so that there is a significant difference in elevation between the vent intake 114 and the highest point of the curved portion 120. Since the vehicle 8 (FIG. 1) will generally spend the majority of its time in a position that orients the transfer case 26 at or close to its baseline operating position and since relatively little air is transmitted through the vent aperture 64, lubricating fluid (typically mist) that is received into the vent intake 114 is able to collect on the interior surface of the portion of the vent relocation conduit 110 that forms the extending portion 122 and thereafter drain out the vent intake 114.

The vent relocation conduit 110, in the example shown, has a length sufficient to extend from the vent aperture 64 to the vent intake 114 as shown. In transfer cases of various sizes, the length of the vent relocation conduit 110 can have various lengths. In the example shown, the vent relocation conduit 110 has a length of approximately 50 cm when measured along the tubing. If the distance between the vent discharge 112 and the vent intake 114 is measured linearly, the linear distance is approximately 35 cm. In other examples, the vent relocation conduit 110 has a length of at least 25 cm. In another example, the vent relocation conduit 110 has a length that is greater than an outer diameter of the first sprocket 90. Such relative sizing can provide a vent relocation conduit 110 that extends from a location on one side of the first sprocket 90 to a location on an opposite side of the first sprocket 90.

Figure 6:
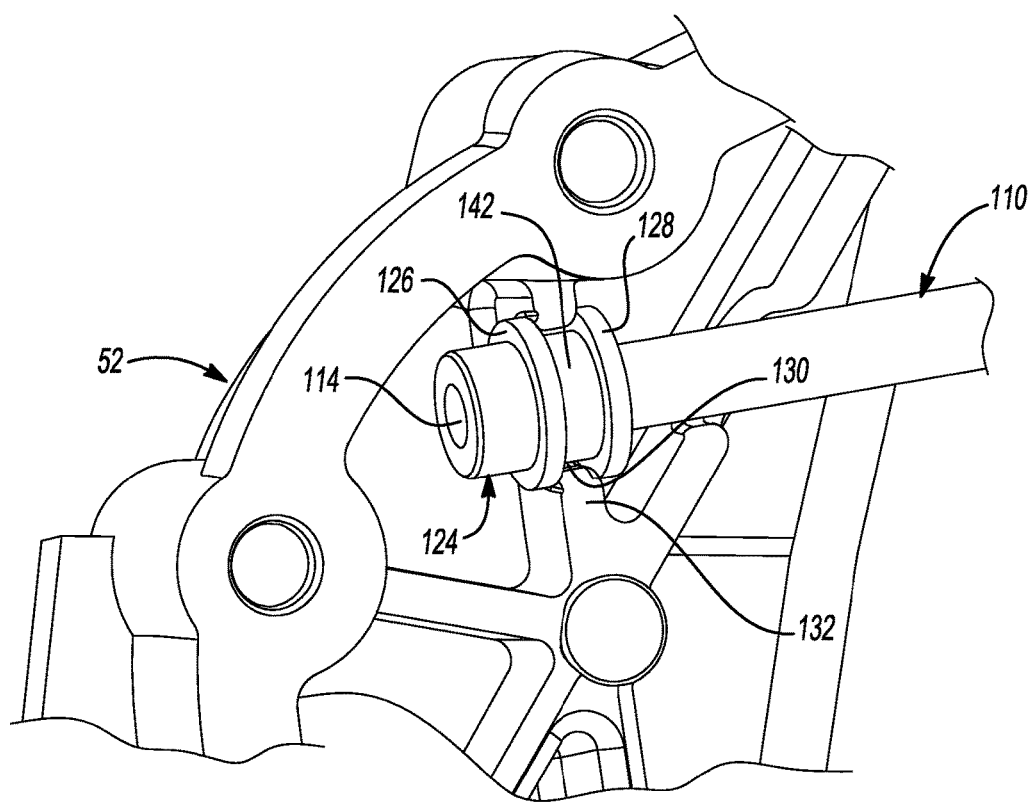
FIG. 6 is a perspective view of a portion of the transfer case of FIG. 1, illustrating a vent intake of the vent relocation conduit as mounted to the housing of the example transfer case.

With reference to FIGS. 5 and 6, the second end of the vent relocation conduit 110 can include an intake end fitting 124 that can be employed to secure the second end of the vent relocation conduit 110 at a desired location within the internal cavity 66. In the particular example provided, the intake end fitting 124 defines a first collar 126 and a second collar 128 that is spaced apart from the first collar 126 by a tubular segment 142. If desired, the first collar 126 and/or the second collar 128 can be integrally formed with the second end of the vent relocation conduit 110 in a desired manner (e.g., molding or heading). The first and second collars 126 and 128 can have an annular shape that projects radially outward from the tubular segment 142. The tubular segment 142 can be received into a U-shaped notch 130 that is formed in a rib 132 of the first portion 54 of the housing 52 and the first and second collars 126 and 128 can be positioned on opposing sides of the rib 132. Optionally, a projection (not shown) on the second portion 56 (FIG. 2) of the housing 52, a threaded fastener (not shown) or other type of retaining member can be employed to limit movement of the tubular segment 142 relative to the rib 132. In this manner, the intake end fitting 124 is retained in a predetermined vent location in the internal cavity 66.

Figure 7:
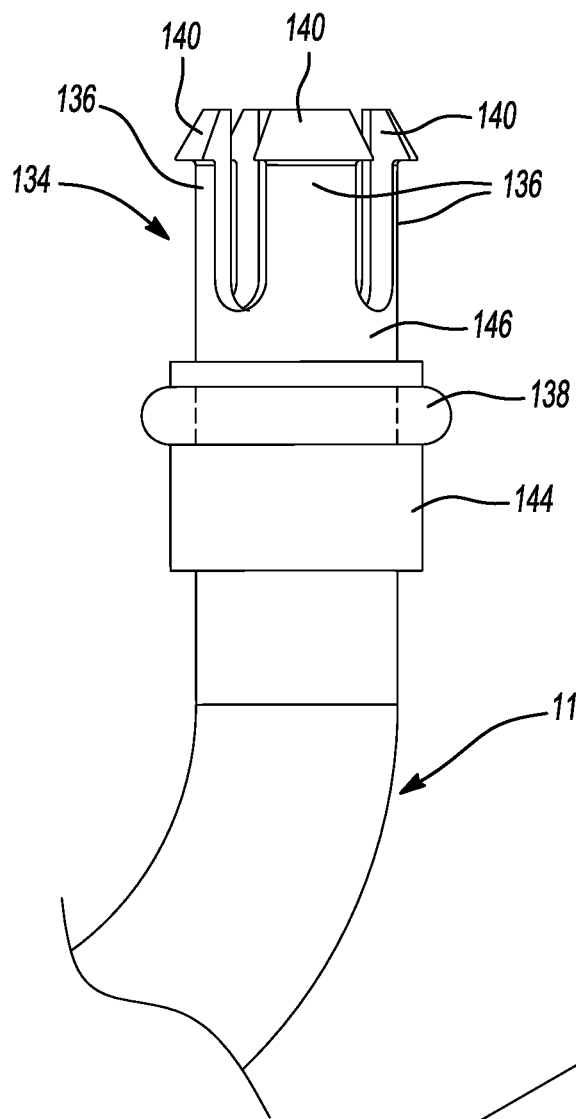
FIG. 7 is an elevation view of a portion of the transfer case of FIG. 1, depicting a discharge end fitting of the vent relocation conduit in more detail.

With reference to FIGS. 5 and 7, the vent relocation conduit 110 can include a discharge end fitting 134 and a seal 138. The discharge end fitting 134 can be any suitable sealed end fitting to connect and seal the first end of the vent relocation conduit 110 to the breather vent 60. In the example shown, the discharge end fitting 134 comprises a sealing segment 144 and a barbed fitting 146. If desired, the sealing segment 144 and the barbed fitting 146 can be formed as a discrete structure that can be assembled to a remainder of the first linear portion 116. The barbed fitting 146 can extend from the sealing segment 144 on a side of the sealing segment 144 opposite the remainder of the first linear portion 116. The barbed fitting 146 can have a plurality of fingers 136 that can each terminate at a barb 140. An outer diameter of the discharge end fitting 134 at the barbs 140 has an outer diameter that is larger than an inner diameter of the vent aperture 64 or larger than an inner diameter of the vent outlet connector 62 that may be installed in the vent aperture 64. As the discharge end fitting 134 is inserted into the vent aperture 64 (and/or into the vent outlet connector 62 that may be installed therein, see FIGS. 8 and 9, for example), the fingers 136 flex radially inward to permit the barbs 140 to move into the vent aperture 64. The fingers 136 then flex radially outwardly such that the barbs 140 return toward their original position and secure the discharge end fitting 134 relative to the vent aperture 64.

The seal 138 can be formed of a suitable elastomer and can be received between and sealingly engage the exterior surface of the sealing segment 144 and an interior surface formed on the housing 52 (or the vent outlet connector 62) to form a fluid-tight seal there between.

Figure 8:
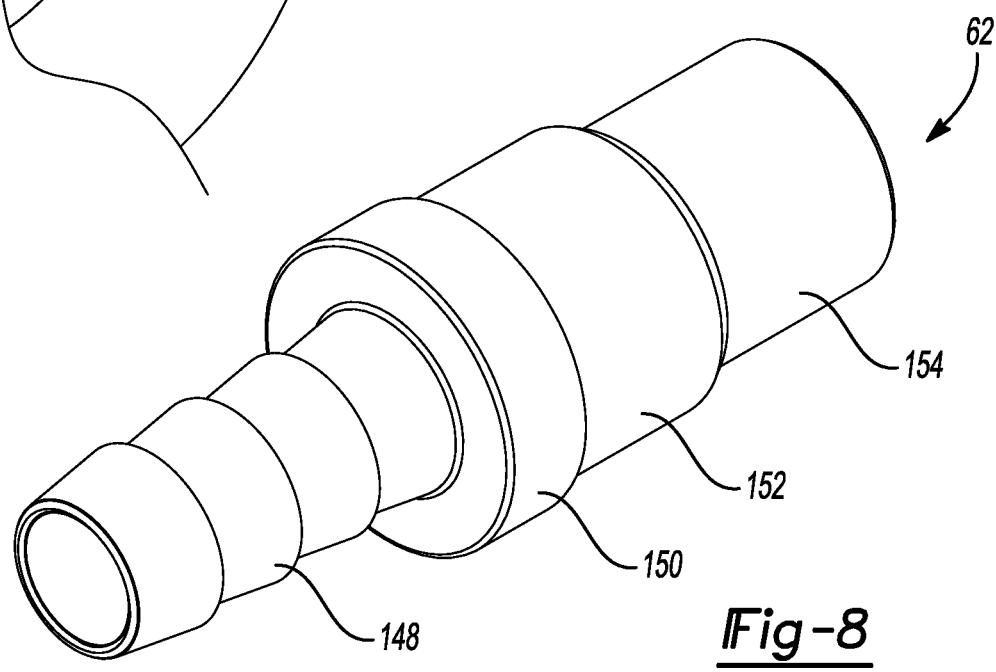
FIG. 8 is a perspective view of a vent outlet connector that can be mounted in the housing of the example transfer case to connect the discharge end fitting to the housing.
Figure 9:
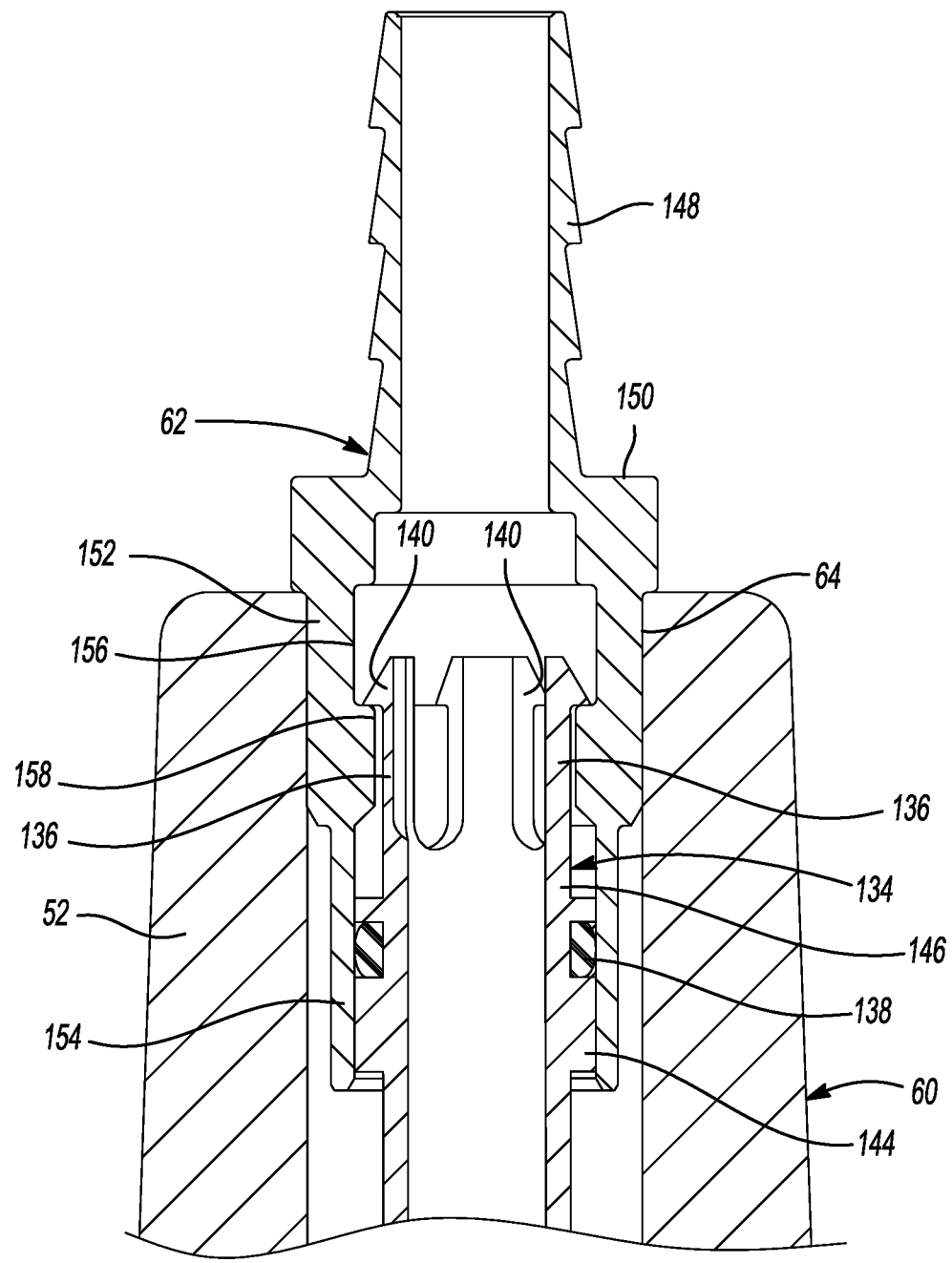
FIG. 9 is a sectional view along a plane indicated in FIG. 2, illustrating the discharge end fitting mating to the vent outlet connector.

With reference to FIGS. 8 and 9, the optional vent outlet connector 62 can be mounted in the vent aperture 64. The discharge end fitting 134 (FIG. 7) can couple with the vent outlet connector 62 to secure the first end of the vent relocation conduit 110 to the breather vent 60. The vent outlet connector 62 can be integrally formed or can be made of separate pieces that are joined together. In one example, the vent outlet connector 62 is formed of a suitable steel material. In other examples, other materials such as other metals, alloys, plastics or composites can be used. The vent outlet connector 62, in one example, is a hollow component such that can be fluidly connected with the vent relocation conduit 110 to permit venting of the internal cavity 66 of the transfer case 26 as previously described.

The vent outlet connector 62, in the example shown, includes an extension portion 148, a shoulder portion 150, a first cylindrical portion 152 and a second cylindrical portion 154. As shown in FIG. 9, when the vent outlet connector 62 is installed in the vent aperture 64, the shoulder portion 150 abuts an external surface of the housing 52 at the vent aperture 64. The shoulder portion 150 and the extension portion 148 project away from the external surface of the housing 52 externally to the transfer case 26. The first cylindrical portion 152 is mated to the internal surface (i.e., the inner diameter) of the vent aperture 64. The second cylindrical portion 154 projects inwardly from the first cylindrical portion 152 in the vent aperture 64.

The extension portion 148 projects outward from the shoulder portion 150 and can include one or more axially aligned frusto-conical formations. As can be appreciated, a length of flexible tubing (not shown) can be installed over the extension portion 148 to fluidly connect the vent outlet connector 62 (and the vent relocation conduit 110) to a location remote from the breather vent 60.

The shoulder portion 150, the first cylindrical portion 152 and the second cylindrical portion 154 can have different outer diameters as shown. The outer diameter of the shoulder portion 150 is greater than the outer diameter of the first cylindrical portion 152 and the outer diameter of the first cylindrical portion 152 is greater than the outer diameter of the second cylindrical portion 154. The outer diameter of the first cylindrical portion 152 is sized relative to an inner diameter of the vent aperture 64 so as to permit the first cylindrical portion 152 to be inserted into the vent aperture 64 and secured there to. The vent outlet connector 62 can be press fit, welded or otherwise secured in the vent aperture 64 to prevent lubricating fluid that may contact the breather vent 60 from the internal cavity 66 from escaping between the mating surfaces of the vent aperture 64 and the first cylindrical portion 152 of the vent outlet connector 62. In other examples, the vent outlet connector 62 can be threadingly engaged to the vent aperture 64.

As further shown in FIG. 9, the inner surface of the first cylindrical portion 152 includes an engagement groove 156. The diameter of the first cylindrical portion 152 at the engagement groove 156 is greater than the diameter of the first cylindrical portion 152 axially adjacent the engagement groove 156 at a passage 158. As such, the engagement groove 156 is an annular recess at the inner surface of the first cylindrical portion 152. When the discharge end fitting 134 is inserted into the vent outlet connector 62, the barbs 140 can flex radially inward at the fingers 136 as the barbs 140 pass through the passage 158. The barbs 140 can then flex radially outward and engage the inner surface of the first cylindrical portion 152 at the engagement groove 156. Such engagement limits the discharge end fitting 134 from moving axially relative to the vent outlet connector 62 and can secure the discharge end fitting 134 to the vent outlet connector 62. As further shown, the seal 138 of the discharge end fitting 134 can compress and sealingly engage the inner surface of the second cylindrical portion 154. In other examples, other means can be employed to couple the vent discharge 112/first end of the vent relocation conduit 110 to the breather vent 60, such as threaded connectors, compression connectors, clamped connectors and the like.

Figure 10:
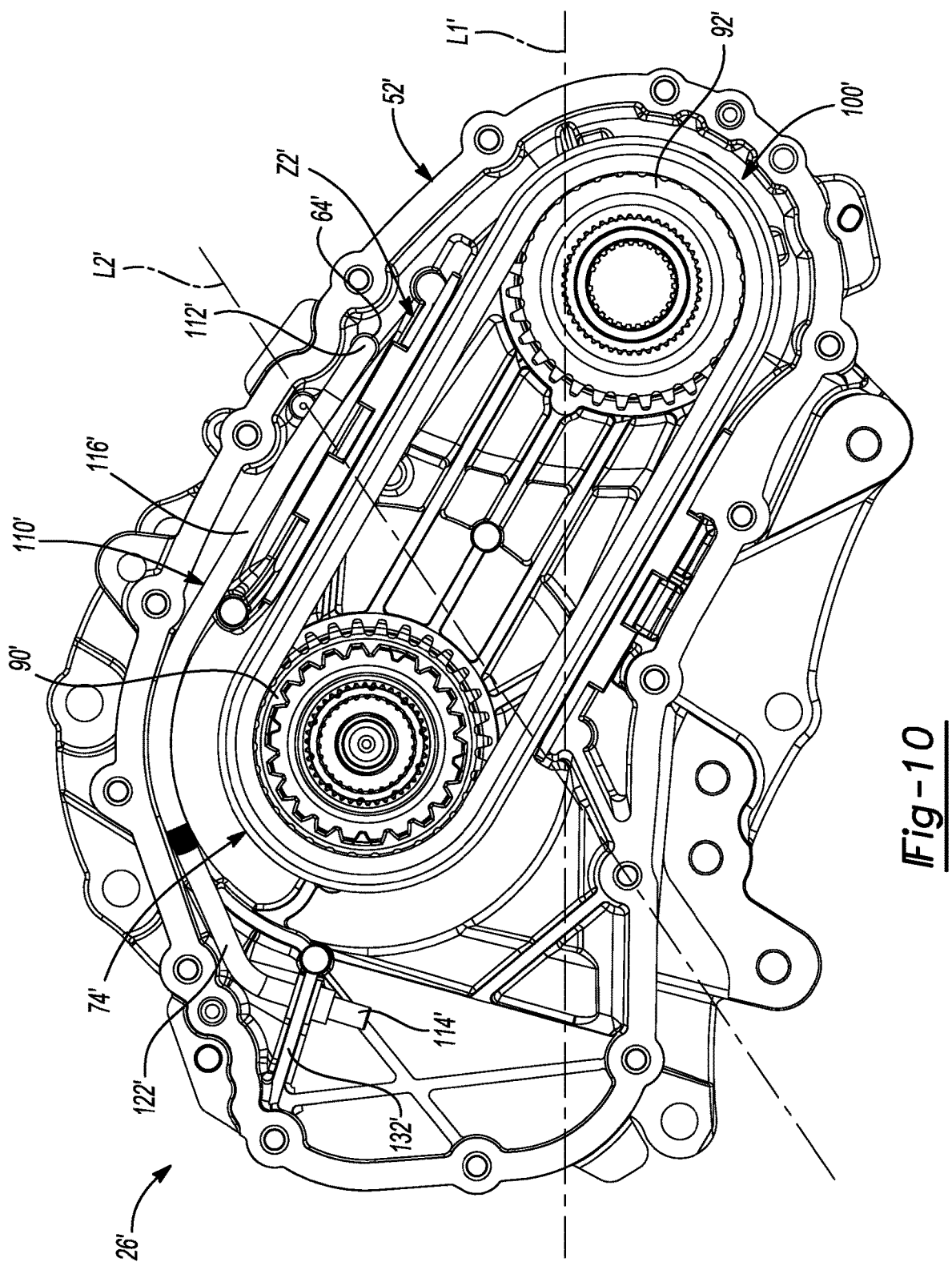
FIG. 10 is a perspective view of another transfer case constructed in accordance with the teachings of the present disclosure.

Referring now to FIG. 10, another exemplary transfer case 26' is illustrated. Except as described herein, the transfer case 26' is similar to the transfer case 26 (FIG. 2) described above.

The transfer case 26' has a different profile and different relative spacing of the first sprocket 90', the second sprocket 92' and the housing 52'. In addition, the size and shape of the housing 52' causes the transfer case 26' to have lubrication levels and zones that are positioned and/or shaped somewhat differently from those that were previously described. In this example, the static lubricant level L1' of the sump 100' when the transfer case 26' is in the baseline operating position and the power transfer assembly 74' is not operating is positioned such that the second sprocket 92' is only partially disposed below the static lubricant level L1'.

As further shown, the transfer case 26' includes a surge level L2' that is positioned differently relative to the vent aperture 64' from that previously shown. In this example, the surge level L2' is positioned such that the vent aperture 64' is positioned in the surge zone Z2' when the transfer case 26' is in the baseline operating position.

The vent relocation conduit 110', in this example, has a different shape from the vent relocation conduit 110 previously described. The vent relocation conduit 110' extends from the vent discharge 112' along a first linear portion 116' and then curves around the first sprocket 90' before projecting outward and away from the first sprocket 90' at the extending portion 122'. The vent intake 114' is positioned at a vent location that faces away from splashed lubricating fluid that is generated by the first sprocket 90' and the chain 94'.

In the example shown in FIG. 8, the rib 132' of the housing 52' is oriented relative to the first sprocket 90' and to the chain 94' such that the rib 132' shields the vent intake 114' from splashed lubricating fluid. When the first sprocket 90' and the chain 94' are rotating during operation, the lubricating fluid that is splashed can have a trajectory that travels tangentially from an upper portion of the first sprocket 90' and/or the chain 94'. Such splashed lubricating fluid that falls from this region follows a downward path. The positioning of the rib 132' and the relative positioning of the vent intake 114' causes vent intake 114' to be shielded by the rib 132'. This relative positioning further limits the lubricating fluid from entering the vent relocation conduit 110' through the vent intake 114'.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A driveline power transmitting component for a vehicle, the driveline power transmitting component being orientable into a predetermined range of operating positions that are associated with operation of the vehicle on a range of road grades, the predetermined range of operating positions including a baseline operating position that is associated with operation of the vehicle on a flat, level surface, the driveline power transmitting component comprising:

a housing defining an internal cavity and a vent aperture, the internal cavity defining a sump, the sump being adapted to hold a volume of a lubricating fluid that establishes a lubricant level within the sump when the driveline power transmitting component is oriented in the baseline operating position but is not operated to transmit rotary power, the vent aperture extending through the housing;

a first rotary drive member received in the housing and projecting into the internal cavity, the first rotary drive member being rotatable relative to the housing about a first axis;

a second rotary drive member received in the housing and projecting into the internal cavity, the second rotary drive member being rotatable relative to the housing about a second axis;

a power transfer assembly configured to transmit rotary power between the first and second rotary drive members, wherein a surge zone and a splash lubrication zone are created when the power transfer assembly transmits rotary power between the first and second rotary drive members to drive the second rotary drive member in a predetermined rotational direction, the surge zone being at least partly formed by a first portion of the lubricating fluid that clings to an element of the power transfer assembly as the element of the power transfer assembly moves out of the lubricating fluid in the sump, the splash lubrication zone comprising a volume of the internal cavity where a second portion of the lubricating fluid is discharged due to centrifugal force from components of the driveline power transmitting component that rotate in the internal cavity when the driveline power transmitting component is operated, wherein the vent aperture is disposed in at least one of the surge zone, the splash lubrication zone and the sump when the driveline power transmitting component is disposed in at least one orientation in the predetermined range of operating positions; and a tube received in the internal cavity and coupled to the housing, the tube having a vent discharge and a vent intake, the vent discharge being coupled in fluid communication with the vent aperture, the vent intake being positioned in the internal cavity at a vent location that is outside of the surge zone and the sump, the vent location being additionally positioned either outside of the splash lubrication zone or within the splash lubrication zone but facing away from splash lubrication generated by the components of the driveline power transmitting component.

2. The driveline power transmitting component of claim 1, wherein the tube is integrally and unitarily formed.

3. The driveline power transmitting component of claim 1, wherein the tube is formed of a non-porous material.

4. The driveline power transmitting component of claim 1, wherein the vent aperture is located in the surge zone when the driveline power transmitting component is disposed in baseline operating position.

5. The driveline power transmitting component of claim 1, wherein the tube has a developed length and wherein the tube has substantially constant interior cross-sectional area over substantially all of its developed length.

6. The driveline power transmitting component of claim 1, wherein the tube is void of openings between the vent intake and the vent discharge.

7. The driveline power transmitting component of claim 1, wherein a portion of the tube proximate the vent intake is received between a plurality of ribs that are formed on the housing, the ribs cooperating to constrain movement of the portion of the tube relative to the housing.

8. The driveline power transmitting component of claim 7, wherein the portion of the tube includes a collared end fitting that is received into a notch in one of the ribs in the housing.

9. The driveline power transmitting component of claim 1, wherein the tube is made of a plastic material.

10. The driveline power transmitting component of claim 1, wherein the tube has a length of at least 25 cm.

11. The driveline power transmitting component of claim 10, wherein the tube has a length of at least 50 cm.

12. The driveline power transmitting component of claim 1, wherein the tube is contoured such that a portion of the tube is disposed vertically above the vent intake when the driveline power transmitting component is disposed in the baseline operating position.

13. The driveline power transmitting component of claim 12, wherein at least a portion of the tube that is disposed vertically above the vent intake when the driveline power transmitting component is in the baseline operating position is sloped at a constant angle.

14. The driveline power transmitting component of claim 12, wherein at least a first portion of the tube that is disposed vertically above the vent intake when the driveline power transmitting component is in the baseline operating position is arcuate in shape.

15. The driveline power transmitting component of claim 14, wherein a second portion of the tube that is disposed vertically above the vent intake when the driveline power transmitting component is in the baseline operating position is sloped at a constant angle.

16. The driveline power transmitting component of claim 15, wherein the second portion of the tube is disposed between the first portion of the tube and the vent intake.

17. The driveline power transmitting component of claim 1, wherein the power transfer assembly comprises a chain and a pair of sprockets.

* * * * *